May 22, 1934.　　　J. N. BARTLETT　　　1,959,944
AMUSEMENT DEVICE
Filed April 16, 1930　　3 Sheets-Sheet 1
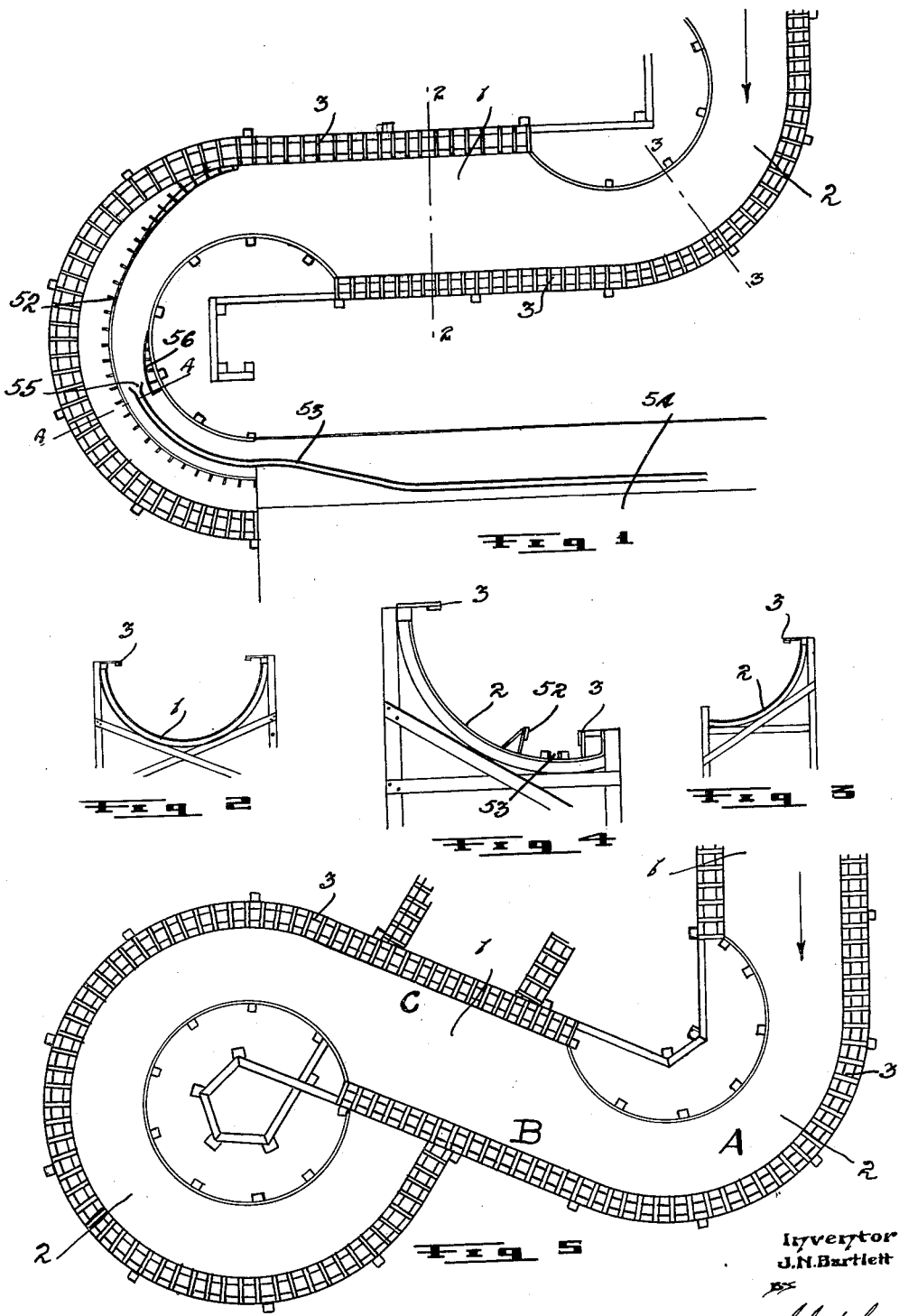

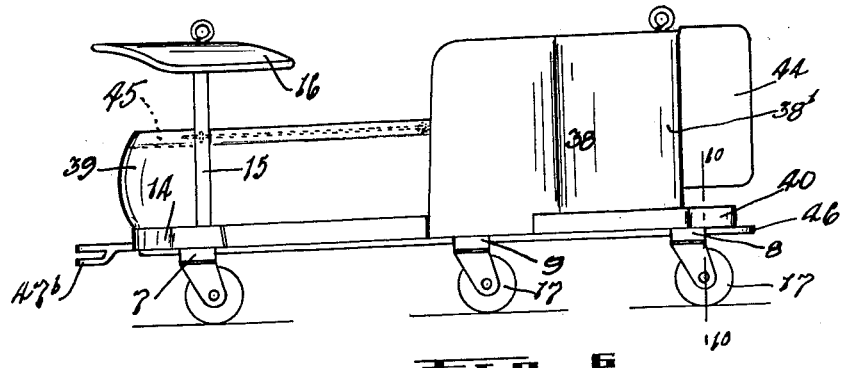
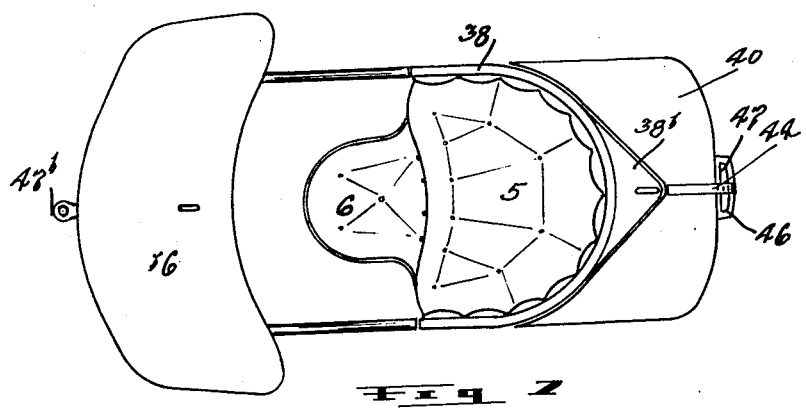
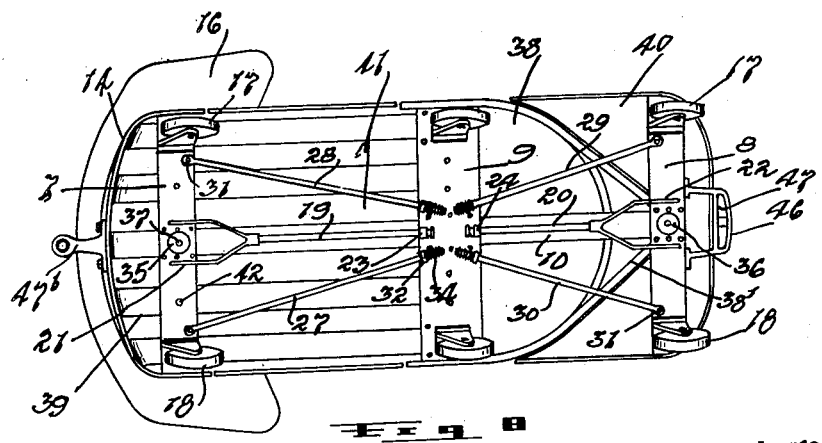

May 22, 1934.  J. N. BARTLETT  1,959,944
AMUSEMENT DEVICE
Filed April 16, 1930  3 Sheets-Sheet 3
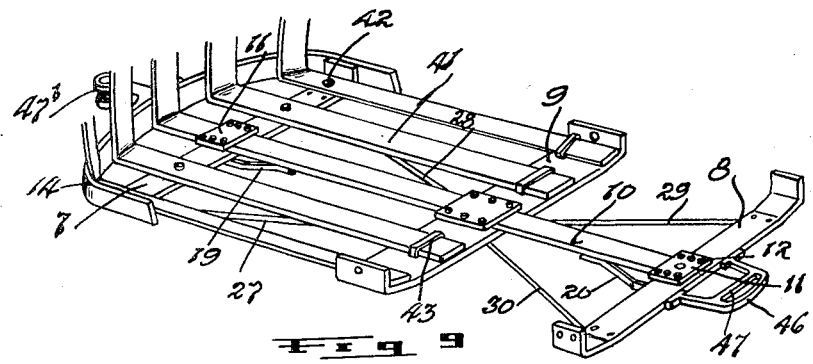
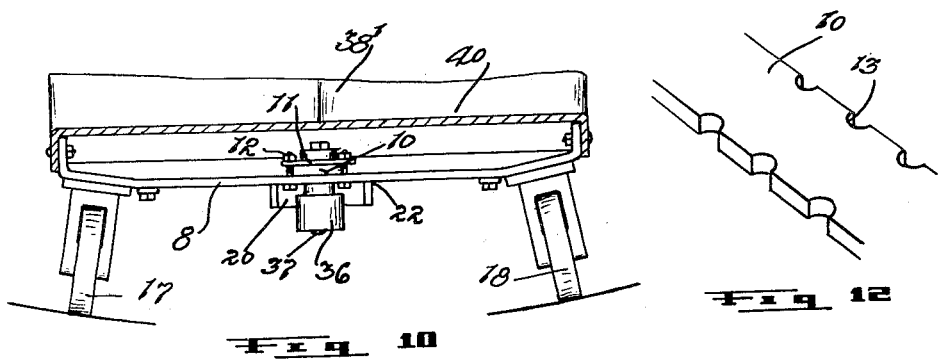
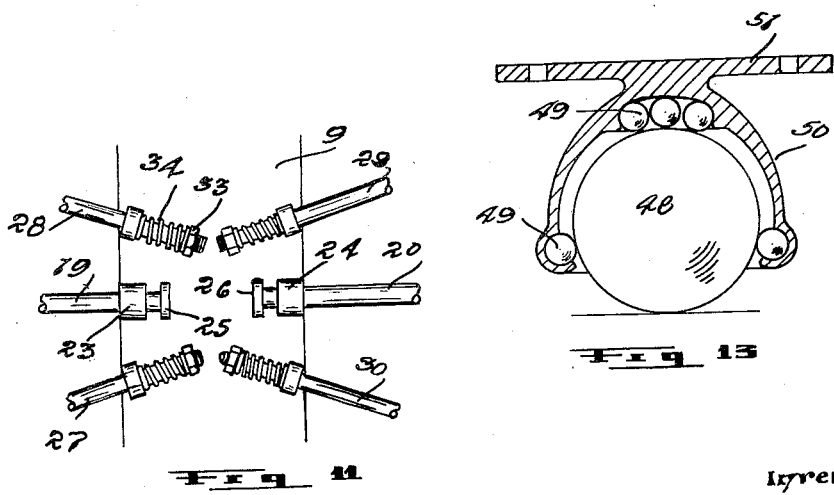
Inventor
J. N. Bartlett Patented May 22, 1934

1,959,944

UNITED STATES PATENT OFFICE 1,959,944

AMUSEMENT DEVICE

John N. Bartlett, Winnipeg, Manitoba, Canada

Application April 16, 1930, Serial No. 444,789

25 Claims. (Cl. 104—63)

The invention relates to improvements in amusement devices and an object of the invention is to provide a banked runway having turns and interconnecting cross over portions therebetween and a passenger carrier for operating on the runway, the design of the runway and the carrier being such that the carrier will be self steering throughout its entire course and while giving the occupants thereof the desired thrills as required in a publicly used amusement device of this class.

A further object of the invention is to design the runway so that the self steering passenger carrier moves throughout the entire run under the action of gravity and further such that a relatively high velocity is maintained throughout.

A further object is to construct the runway and self steering passenger carrier such that the passenger carrier sweeps around the successive banked turns at a relatively high speed and at the high side of the banked turns and swoops at high speed angularly across the banked portions of the runway connecting the turns, such irregular path of travel of the carrier giving the passenger a continuous thrill throughout the entire ride and with entire safety.

A further object of the invention is to connect the straight cross over portions between turns or bends so that they will accommodate a varying velocity of the carrier at the time the carrier is leaving the bends or turns in the runway, the velocity obviously varying according to the load or number of passengers in the carrier.

A further object of the invention is to construct the runway so that a constant radius of curvature can be used.

A further object of the invention is to provide means at the end of the runway whereby the carrier is self braking, such being brought about by terminating the end of the runway in a bend and providing a crowding rail on the runway which frictionally engages with the outer side of the moving carrier and gradually brings the carrier to a stop in a location at the lower part of the runway.

A further object of the invention is to provide a flexible passenger carrier for riding the runway, the carrier being entirely self steering throughout its course and the flexibility of the carrier permitting all points of the carrier in contact with the runway to bear with equal pressure on the runway in all positions of the carrier on the runway.

A further object is to design the carrier so that it simulates an aeroplane and further to provide the carrier with a novel type of coupling so that a number of carriers can be coupled together and operated over the runway and will not interfere one with the other in so far as their self steering action is concerned.

A further object of the invention is to provide the carrier with supporting wheels or roller supports all independently movable in any direction and mounted such that their vertical axes will intersect the runway at right angles when operating thereon.

With the above more important and other minor objects in view which will become more apparent as the description proceeds, the invention consists essentially in the arrangement and construction of parts hereinafter more particularly described, reference being had to the accompanying drawings, in which:—

Fig. 1 is a plan view of a portion of the runway and showing an arrangement of parts at the lower end of the runway.

Fig. 2 is a vertical cross sectional view at 2—2 Figure 1.

Fig. 3 is a cross sectional view at 3—3 Figure 1.

Fig. 4 is an enlarged detailed cross sectional view at 4—4 Figure 1.

Fig. 5 is a plan view of a portion of the runway showing several turns.

Fig. 6 is a side view of the passenger carrier.

Fig. 7 is a top plan view thereof.

Fig. 8 is an inverted plan view thereof.

Fig. 9 is a perspective view of the under frame work of the carrier.

Fig. 10 is an enlarged detailed cross sectional view at 10—10 Figure 6.

Fig. 11 is an enlarged detailed inverted plan view showing the connections of the rods to the centre cross bar.

Fig. 12 is a perspective view showing the side notches in the longitudinally extending centre bar of the frame.

Fig. 13 is an enlarged detailed vertical sectional view through a modified type of roller support.

In the drawings like characters of reference indicate corresponding parts in the several figures.

This invention relates to an improvement in amusement devices of the type shown in my prior Patent No. 1,633,204 of June 21, 1927 and wherein a passenger carrier operates on a banked runway, the design of the runway being such that the carrier will be self steering throughout its entire course and while giving the occupants thereof the desired thrills as required in a publicly used amusement device.

In the present disclosure, the runway inclines from the top end of the runway to the lower end and the carrier operates thereover under the action of gravity and the runway is provided at many points throughout its length with turns and cross overs which give the desired excitement and thrills.

When the carrier has reached the lower end of the runway, its velocity is diminished to bring it to a stop when it is then loaded and subsequently elevated to the elevated end of the runway, the arrangement for loading and elevating being of the same nature as now used in those well known amusement devices called roller coasters. I have not considered it necessary, accordingly to give a detailed description of the manner in which this is done nor have I considered it necessary to show the entire runway as it will be built up of a number of banked straight portions and a number of banked bends or turns connecting the straight portions all of which may vary considerably but which will generally follow a construction of the nature shown in Figures 1 and 5. The under structure will be supported by suitable trusses to carry the imposed load with the required factor of safety.

The banked turns or bends in the runway may be complete spirals or partial turns, a complete spiral being shown in Figure 5, a right angled turn in Figure 1 and a turn somewhat greater than a right angle in Figure 5. The runway can be made from any suitable material and the banked cross over straight portions 1 connecting the bends or turns are herein shown (see Figure 2) as semi-circular in vertical cross section. The banked turns or bends 2 between the banked cross over straight portions are herein shown (see Figures 3 and 4) slightly greater than a quarter circle in vertical cross section, the radius of the curve being the same for the straight and turned portions. Guards 3 are secured to the edges of the runway to prevent any possibility of accident due to the carrier running off the edges of the runway. The runway is built throughout its entire length so that the carrier later described in detail operating thereon will be self steering throughout its entire course.

I wish here to point out that in my prior Patent 1,633,204, the straight portions of the runway connecting the bends were relatively narrow and practically unbanked whereas in the present application, the straight portions of the runway are relatively wide and banked at both sides so that the carrier is free to move across from one side of the runway to the other, finding its own course of travel in passing across depending on the velocity which it has when leaving the turn.

In Figures 1 and 5, I have placed arrows on the runway to indicate the direction of travel of the carrier over the runway and assuming, say in Figure 5, that the carrier is rounding the bend A at a considerable velocity at which time it will be towards the high or outer side of the runway, then when the carrier reaches a point such as B, it will tend to gravitate and run across the runway to the other side to a point such as C and there is sufficient distance in the straight portion of the runway to accommodate the varying velocity which any carrier might have when rounding the turn A.

It will be particularly noted that the carrier is only restrained in its movement between the turns in the runway by the forces acting and the curvature of the runway and that the straight portions of the runway between turns can be made to accommodate the varying velocities of the carriers after they have passed around the turn and that such straight portions permit of the passing across of the carrier from one side of the runway to the other between turns. In the above description, it is to be remembered, of course, that the runway is inclined from end to end so that the loaded carrier is moving under the action of gravity.

The carrier which I employ for operating on the runway is herein shown as a wheeled vehicle adapted to carry conveniently two passengers, the seat 5 thereof having a forward central extension 6, such permitting one person to sit on the seat 5 with his legs spread and another person to sit on the extension 6 between the former person's legs. The carrier is designed to flex to accommodate the curvature of the runway at all points and with all rollers or wheels bearing on the runway with equal pressure. The structural details of the carrier are now described.

Front, rear and intermediate, flat lying, cross bars 7, 8 and 9 are provided and these bars are permanently connected to a centrally located, longitudinally extending, flat spring bar 10. In the present instance, the connection is made by placing a clamping plate 11 above the spring bar at each place where it crosses the cross bars and bolting the clamping plate to the cross bar, the bolts 12 entering semicircular notches 13 provided in the edges of the spring bar, this latter arrangement positively preventing any possibility of end shifting of the spring bar in regard to the cross bars. The ends of the front bar 7 are up turned as is also the front end of the bar 10 and to such up turned bar ends, I permanently fasten a bowed bar 14. Vertical struts 15 are permanently fastened also to the up turned ends of the bar 7 and these struts carry a wing 16 simulating the wing of an aeroplane. Each of the bars 7, 8 and 9 is provided with a pair of castor wheels 17 and 18 and it will be here observed (see Figure 10) that the ends of the bars are bent upwardly so that the castor wheels will be always positioned at right angles to the face of the runway when they are operating over the same.

Similar rods 19 and 20 are also provided, these rods having their front and rear ends respectively forked and permanently welded as indicated at 21 and 22 to the cross bars 7 and 8 and their inner ends slidably mounted in bearings 23 and 24 provided on the under side of the bar 9 and fitted at the inner sides of said bearings with enlarged ends or heads 25 and 26. Similar radius rods 27, 28, 29 and 30 connect the cross bar 9 with those 7 and 8. These radius rods have their outer ends pivotally attached at 31 to the bars 7 and 8 and their inner ends slidably received in similar bearings 32 attached to the under side of the bar 9. The rods extend inwardly beyond the bearings 32 and are provided with nuts 33 and springs 34, the springs expanding and contracting to accommodate the movement of the rods as occasioned by the movement of the bars 7 and 8. Centrally and on the under side, the bars 7 and 8 carry similar rollers 35 and 36, such rollers being mounted on vertical pivot pins 37. The value of these rollers will be later described.

The body of the carrier comprises the seat section 38, the front section 39 and the rear section 40, these sections being independent of one another so that the flexing of the under structure of the carrier when operating on the runway will be accommodated. The front section is carried by the cross bar 7, the rear section by the cross bar 8 and the seat section by the cross bar 9. The floor boards 41 are made of spring steel strips suitably spaced and having their forward ends each connected by a single bolt 42 to the cross bar 7 and their rear ends each passing slidably through a strap 43 secured to the bar 9. Any suitable flexible floor covering can be looosely placed over these steel bars 41 to close in the bottom of the carrier at this point.

The seat section, which includes the seat 5 and its extension 6, is mounted on a three point suspension, the front part of the section being attached by two studs located directly over the castor wheels near the ends of the cross member 9 and the rear V-shaped part 38' thereof being attached by a stud to the rear bar 8 in a location centrally of the same directly above the guide wheel 36. The rear section 40 as before stated is carried wholly by the bar 8.

A vertical fin 44 is attached to the rear end of the seat section, this simulating the rudder of an aeroplane and sufficient clearance is reserved between the rear section and the seat section to permit of their independent free movement. The front ends of the spring bars 41 are up turned and have their upper ends fastened to a bowed bar 14. Canvas or other material is placed over these up turned ends to enclose the same.

To the rear bar 8, I attach permanently a coupling member 46 presenting a transverse slot 47 and this slot is adapted to receive the coupling pin of the coupling member 47' of a following carrier hitched to the front carrier. By utilizing this slotted coupling, I can hitch two or more carriers together one after another in trains and without hampering the free movement of the carriers on the runway.

It will be particularly noted that by constructing the carrier in the manner above described, it is free to flex when operating on the runway and while maintaining all wheels under equal pressure on the runway. While I have shown the carrier as equipped with castor wheels, I wish it to be understood that it could be equipped with anti-friction rollers of well known design and as shown in Figure 13. In this type of device, the main ball 48 is carried by ball bearings 49 mounted in a cup or socket 50 having an attaching base 51. The ball 48 is free to rotate in all directions.

The carrier is brought to a stop at the end of the run by utilizing a turn in the runway as shown at the left hand side of Figure 1 of the drawings and providing the runway with a crowding or braking rail 52 which passes gradually from the outer high side of the runway to a point adjacent the lower part of the runway, the arrangement being such that the moving carrier will be caught by the braking rail and guided gradually inwardly and the friction developed between the side of the carrier and the contacting rail will bring the carrier to a walking pace. It will here be remembered that centrifugal force is acting to hold the carrier against the braking rail.

A channel shaped guideway 53 is provided on the lower end of the runway which is adapted to receive the rollers 35 and 36 and guide the carrier to unloading position such as adjacent an unloading platform 54. One end of this guideway has a flared mouth as indicated at 55 to insure of the entrance of the rollers and this latter is also made more positive by providing an inner guide rail 56 to engage with the inner side of the carrier.

After the carrier has been brought to the platform, it will be elevated to the starting end of the runway in the well known manner as now employed with roller coaster cars.

What I claim as my invention is:—

1. In an amusement device, a runway embodying banked turns and banked interconnecting cross over portions tangential to the turns and having the banking constant throughout the runway.

2. In an amusement device, a runway embodying banked cross over portions connecting banked turns, adjacent turns being in opposite directions and having the banking constant throughout the runway.

3. In an amusement device, an inclined runway embodying alternate oppositely directed banked turns interconnected by straight banked cross over portions and having the banking constant throughout the runway.

4. In an amusement device, a runway embodying banked turns and banked interconnecting cross over portions, the banking being constant throughout the runway.

5. In an amusement device, a gravity runway inclining from end to end and embodying banked alternated reversed turns and banked straight cross over portions connecting the turns and having the banking constant throughout the runway.

6. In an amusement device, a gravity runway inclining from end to end and embodying banked alternated reversed turns and banked straight cross over portions connecting the turns, the banking of the runway being constant from end to end.

7. In an amusement device, in combination, a runway having banked turns therein and straight interconnecting banked portions connecting the turns said banking being constant throughout the runway and a self steering passenger carrier for operating on the runway at a relative high velocity.

8. In an amusement device, in combination, a runway having a number of banked turns therein and straight interconnecting banked portions between the turns and with the turns alternated clockwise and anticlockwise and the banking constant throughout the runway and a self steering passenger carrier for operating on the runway at relatively high velocity.

9. In an amusement device, in combination, an inclined runway having banked turns therein and straight interconnecting banked cross over portions between the turns, the turns being alternately clockwise and anticlockwise and the banking being constant throughout the runway and a self steering wheeled passenger carrier for operating under the action of gravity over the runway.

10. In an amusement device, a runway having alternated clockwise and anticlockwise banked turns therein and banked cross over portions connecting the turns, the turns and cross over portions aforesaid having a constant radius of curvature transversely.

11. In an amusement device, in combination, a runway having alternated clockwise and anticlockwise banked turns therein and banked cross over portions connecting the turns, the turns and cross over portions aforesaid having a constant radius of curvature transversely and a self steering wheeled passenger carrier for operating on the runway.

12. In an amusement device, in combination, a runway inclined from end to end and having alternated clockwise and anticlockwise banked turns therein and banked cross over portions connecting the turns, the turns and cross over portions aforesaid having a constant radius of curvature transversely and a self steering wheeled passenger carrier for operating on the runway.

13. In an amusement device, an inclined runway having alternated clockwise and anticlockwise turns therein and cross over portions connecting and tangential to the turns, the cross over portions being semicircular in cross section and the turn portions a quarter circle in cross section and of the same radius as the cross over portions, the said turns leading to and from the cross over portions at opposite sides of the runway.

14. In an amusement device, an inclined banked runway having the lower end thereof terminating in a banked turn and provided at the turn with a crowding rail spiralling across the runway from one side to a point located adjacent the centre of the runway.

15. In an amusement device, in combination, a banked runway having the lower end thereof terminating in a banked turn, a wheeled passenger carrier for operating on the runway, the banking of the runway being such that the carrier is self steering in its movement over the runway and a braking rail at the turn frictionally engageable with the moving carrier and adapted to bring the carrier virtually to a stop in a location centrally in the lower part of the runway.

16. In an amusement device, in combination, a banked runway and a flexible passenger carrier for operating on the runway at a comparatively high velocity, the flexibility of the carrier allowing it to flex to conform to the banking of the runway and the banking of the runway being designed such that the carrier is self steering in its movement over the runway.

17. In an amusement device, in combination, an inclined banked runway, a gravity actuated flexible passenger carrier for operating on the runway, the flexibility of the carrier allowing it to flex to conform to the banking of the runway and the banking of the runway being designed such that the carrier is self steering in its movement thereover.

18. In an amusement device, in combination, an inclined runway having alternated clockwise and anticlockwise banked turns and straight cross over banked portions connecting the turns and a wheeled gravity actuated passenger carrier for operating on the runway, the passenger carrier having a flexible body permitting it to flex to conform to the banking of the runway and the banking of the runway being designed such that the carrier is self steering in its movement over the runway.

19. In an amusement device, in combination, a banked runway having turns and interconnecting straight portions, the radius of curvature of the banking being continuous throughout the runway and a flexible wheeled passenger carrier for operating on the runway, the flexing of the carrier permitting of all wheels contacting continuously with the runway in the movement of the carrier thereover, the said wheels being canted to maintain at all times a position substantially at right angles to the runway over which they are travelling.

20. In an amusement ride, in combination, a banked runway, a castor wheeled flexible passenger car for operating on the runway and rendered self steering by the banking of the runway and a crowding rail engageable with the side of the car to force it from its otherwise free course to a desired position on the runway.

21. In an amusement ride, in combination, a banked runway, a castor wheeled flexible passenger car for operating on the runway and rendered self steering by the banking of the runway, a crowding rail engageable with the side of the car to force it from its otherwise free course to a desired position on the runway and engaging means carried by the runway and the car adapted to positively steer the car on the runway for a predetermined distance of travel after the car has reached the desired position aforesaid.

22. In an amusement ride, in combination, a banked runway and a passenger car for operating on the runway having canted castor wheels whereby the car is self steering throughout its travel on the runway.

23. In an amusement device, in combination, a banked runway having turns and interconnecting cross over portions between the turns and a flexible, wheeled, self steering passenger carrier for operating on the runway, the flexing of the carrier permitting of all wheels contacting continuously with the runway in the movement of the carrier thereover.

24. In an amusement device, in combination, a banked runway having turns and interconnecting cross over portions between the turns and a flexible car body supported by canted castor wheels, the flexing of the body permitting of all wheels contacting continuously with the runway in the movement of the car thereover.

25. In an amusement device, a banked runway and a flexible castor wheeled car for operating on the runway, the said wheels being canted to maintain at all times positions substantially at right angles to the runway.

JOHN N. BARTLETT.